United States Patent
Elser et al.

(10) Patent No.: US 6,669,216 B1
(45) Date of Patent: Dec. 30, 2003

(54) HYDROPNEUMATIC SUSPENSION SYSTEM

(75) Inventors: Dieter Elser, Essingen (DE); Andreas Braun, Schwäbisch Gmünd (DE); Manfred Heintschel, Schwäbisch Gmünd (DE); Wolfgang Zeitz, Sandweg (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 0 days.

(21) Appl. No.: 09/806,388

(22) PCT Filed: Sep. 23, 1999

(86) PCT No.: PCT/EP99/07073

§ 371 (c)(1),
(2), (4) Date: Jul. 2, 2001

(87) PCT Pub. No.: WO00/18597

PCT Pub. Date: Apr. 6, 2000

(30) Foreign Application Priority Data

Sep. 29, 1998 (DE) .......................... 198 44 493

(51) Int. Cl.[7] .............................. B60G 11/26
(52) U.S. Cl. .................... 280/124.106; 280/5.508; 280/124.158; 280/124.159
(58) Field of Search ............... 280/5.508, 5.515, 280/124.157, 124.158, DIG. 1, 124.159, 124.106

(56) References Cited

U.S. PATENT DOCUMENTS

| | | | |
|---|---|---|---|
| 3,917,307 A | | 11/1975 | Shoebridge |
| 4,779,447 A | * | 10/1988 | Rath |
| 4,872,701 A | * | 10/1989 | Akatsu et al. ........ 280/124.159 |
| 4,930,807 A | * | 6/1990 | Lachaize ............. 280/124.106 |
| 4,948,164 A | * | 8/1990 | Hano et al. |
| 5,056,811 A | * | 10/1991 | Fukunaga et al. .... 280/124.159 |
| 5,085,458 A | * | 2/1992 | Kii et al. ............. 280/124.106 |
| 5,089,966 A | * | 2/1992 | Fukushima et al. ................. 280/124.106 X |
| 5,116,077 A | * | 5/1992 | Karnopp et al. ....... 280/124.159 |
| 5,141,244 A | * | 8/1992 | Clotault et al. ....... 280/124.159 |
| 5,246,247 A | * | 9/1993 | Runkel ................ 280/124.156 |
| 5,344,124 A | * | 9/1994 | Runkel ................ 280/124.159 |
| 5,401,053 A | * | 3/1995 | Sahm et al. .......... 280/124.159 |
| 5,547,211 A | * | 8/1996 | Runkel ................ 280/124.156 |
| 5,919,240 A | * | 7/1999 | Ney et al. ............. 280/124.159 |
| 6,102,418 A | * | 8/2000 | Runkel ................ 280/124.159 |

FOREIGN PATENT DOCUMENTS

| | | |
|---|---|---|
| DE | 24 31 027 | 1/1975 |
| DE | 28 44 413 | 4/1980 |
| DE | 40 03 493 | 8/1991 |
| DE | 195 21 747 | 12/1996 |
| DE | 2761008 | * 3/1997 |
| EP | 0 321 310 | 6/1989 |
| FR | 2 761 008 | 9/1998 |
| WO | 90 10551 | 9/1990 |

* cited by examiner

Primary Examiner—Paul N. Dickson
Assistant Examiner—Toan C To
(74) Attorney, Agent, or Firm—Kenyon & Kenyon

(57) ABSTRACT

A hydropneumatic suspension system for motor vehicles, having at least one hydropneumatic support aggregate and one automatic level control system cooperating with the aggregate, the automatic level control system, as a function of the lift position of the wheels, sending hydraulic fluid from the hydropneumatic pressure reservoir into the hydropneumatic suspension cylinders, or drawing hydraulic fluid from the hydropneumatic suspension cylinders into the pressure reservoirs, and the functions of suspension, roll stabilization, and automatic level control being able to be performed using the hydropneumatic suspension cylinders.

4 Claims, 4 Drawing Sheets

HYDROPNEUMATIC SUSPENSION SYSTEM

FIELD OF THE INVENTION

The present invention relates to a hydropneumatic suspension system for motor vehicles.

BACKGROUND INFORMATION

Hydropneumatic suspension systems are described, for example, in German Published Patent Application No. 195 21 747 and French Published Patent Application No. 2 761 008.

Hydropneumatic suspension systems offer decisive advantages in the areas of robustness, suspension comfort, as well as ease and speed of control. However, specific characteristics are a function to a great degree of the load state. A conventional hydropneumatic suspension system is composed of the fundamental elements, gas pressure reservoir, hydraulic cylinder, and connecting oil pressure lines. In place of the normal leaf, air, or coil springs, hydraulic cylinders are installed between the axle and the chassis. They are connected to gas pressure reservoirs by supply lines. The gas in each pressure reservoir acts as the spring, and the oil column in the supply line system acts as the medium transmitting the gas spring forces to the hydraulic cylinders. Damping occurs in the area of the oil column, using appropriate devices in the deflection and rebound directions.

German Published Patent Application No. 40 03 493 describes a hydropneumatic suspension system that has hydropneumatic support aggregates, that is assigned to the vehicle wheels, and an automatic level control system, that cooperates with the aggregates, the hydropneumatic suspension system sending hydraulic fluid, as a function of the lift position of the wheels, from a reservoir into the support aggregates, or drawing hydraulic fluid from the support aggregates into the reservoir.

To keep the power requirements of the system low, an active bypass and delivery system is arranged between the support organs, the bypass and delivery system, as a function of the lift position and/or of the pitch or roll torques acting on the vehicle, permitting the hydraulic fluid to shift between support aggregates arranged opposite each other with respect to the vehicle longitudinal axis and/or with respect to the vehicle transverse axis, circumventing the reservoir. In this hydropneumatic suspension system, the hydraulic fluid is therefore shifted directly between the support aggregates on different sides of the vehicle, or between the front and rear support aggregates, in order to elevate one vehicle side while simultaneously lowering the other vehicle side, or in order, correspondingly, to move the front of the vehicle in the opposite sense with respect to the rear of the vehicle.

German Published Patent Application No. 40 03 493 describes that the same cylinder spaces are supposed to realize both the functions of hydropneumatic suspension as well as roll stabilization. As a result, the hydropneumatic suspension has available to it not the entire piston surface, but rather only the surface on the piston rod side. Moreover, additional control elements are required for realizing the roll compensation.

SUMMARY

It is an object of the present invention to provide a hydropneumatic suspension system which can perform the functions of suspension, roll stabilization, and automatic level control, without requiring supplemental control unit and control elements, and at the same time reducing the number of parts.

The above object of the present invention is achieved by providing a hydropneumatic suspension system as described herein.

By separating the suspension and roll-stabilizing cylinder spaces and at the same time by integrating the roll-stabilization control elements in the suspension cylinders, the component parts can be significantly reduced both in number and in weight. In addition, costly control technology can also be dispensed with.

A further advantage of the present invention is that by lowering the inner side of the vehicle, for the purpose of roll stabilization, the transverse acceleration is reduced, the center of gravity of the vehicle is lowered, and therefore the road holding capacity of the vehicle is improved.

The solution according to the present invention can be realized in at least four design variants. In a first example embodiment, the pressure supply lines of the suspension and automatic level control systems are separated, whereas in a second example embodiment, the systems are supplied by a central pump. The third and fourth example embodiments include a separate system for the front and rear axles, allowing the axles to be controlled independently of one another.

DETAILED DESCRIPTION

Figure 1:
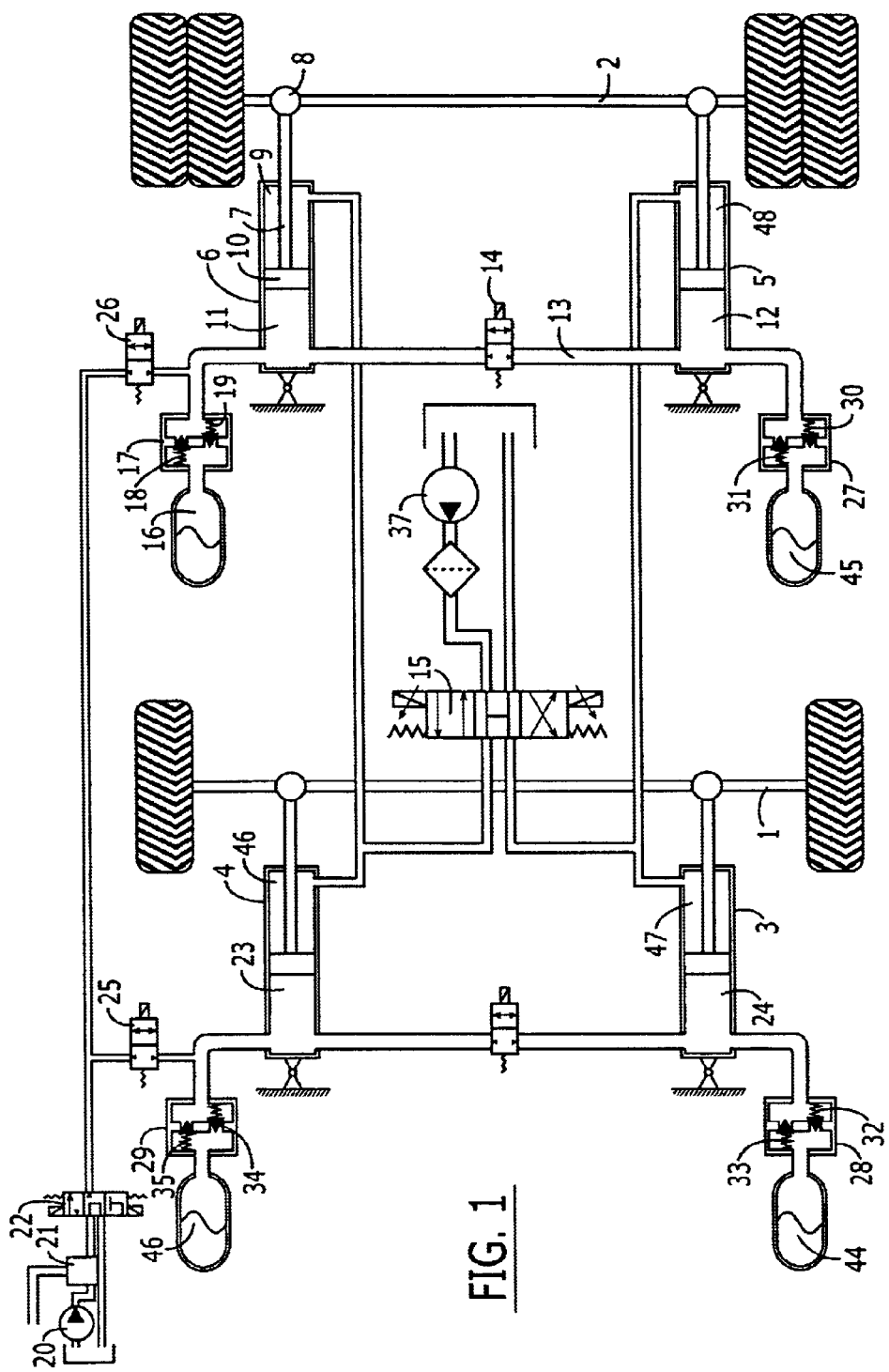
FIG. 1 illustrates a first example embodiment of a hydropneumatic suspension system for a two-axle motor vehicle, having separate pressure supply arrangements for the suspension and automatic level control systems.

In FIG. 1, as a first example embodiment of the present invention, the overall system of a two-axle vehicle is illustrated. Front axle 1, like rear axle 2, has a hydropneumatic suspension system, composed of two piston-cylinder units, each of which having two chambers, hereinafter termed the suspension cylinders. Suspension cylinders 3 and 4 of front axle 1 and suspension cylinders 5 and 6 of rear axle 2 are identical in design and are dimensioned according to the respective axle load. The function of suspension cylinders 3, 4, 5, 6 is explained on the basis of suspension cylinder 6 of rear axle 2. Piston rod 7 is connected to rear axle 2 via a joint 8. In lower suspension cylinder space 9, the control pressure of the roll stabilization system is operative. The pressure of the suspension and automatic level control system operates in upper suspension system space 11, above piston 10. Upper suspension cylinder space 11 is connected by a conduit 13 to corresponding upper suspension cylinder space 12 of opposite suspension cylinder 5 of rear axle 2. In conduit 13, a pilot valve 14 is arranged, which is opened when the roll stabilization system is active.

When an error occurs in the roll stabilization system, for reasons of safety, pilot valve 14 is controlled without current and thus attains the closed position. In this case, pilot valve 15 is also switched without current and is placed in a neutral open position by an integrated, mechanical centering process. In this situation, upper suspension cylinder spaces 11 and 12 are separated from each other and, as a result, function as a stabilizer. Between upper suspension cylinder space 11 and a pressure reservoir 16, a damping valve 17 is arranged, which, in each case at an adjusted intensity, controls the damping of the suspension process using two throttle devices 18 and 19, operating in different directions. The automatic level control is performed by changing the volume of oil in the hydraulic suspension system. For this purpose, using a pump 20 oil is conveyed through a flow-dividing valve 21 and a control valve 22 into the suspension system, i.e., into the upper suspension cylinder spaces 11, 12, 23, 24, via pilot valves 25 and 26.

In accordance with the axle load, various pressures can be supplied via pilot valve 25 to upper suspension cylinder spaces 23 and 24 of front axle 1 and via pilot valve 26 to upper suspension cylinder spaces 11 and 12 of rear axle 2. Pilot valves 25 and 26 are operated for filling and emptying suspension cylinder spaces 11, 12, 23, and 24.

In a further embodiment, damping valves 17, 27, 28, 29 are designed to be controllable. In this way, for example, by using electromagnetic forces to influence throttle devices 18, 19, 30, and 31 as well as 32, 33, 34, and 35, it is also possible to vary the damping characteristics of suspension cylinders 3, 4, 5, 6 as a function of the axle load.

Figure 2:
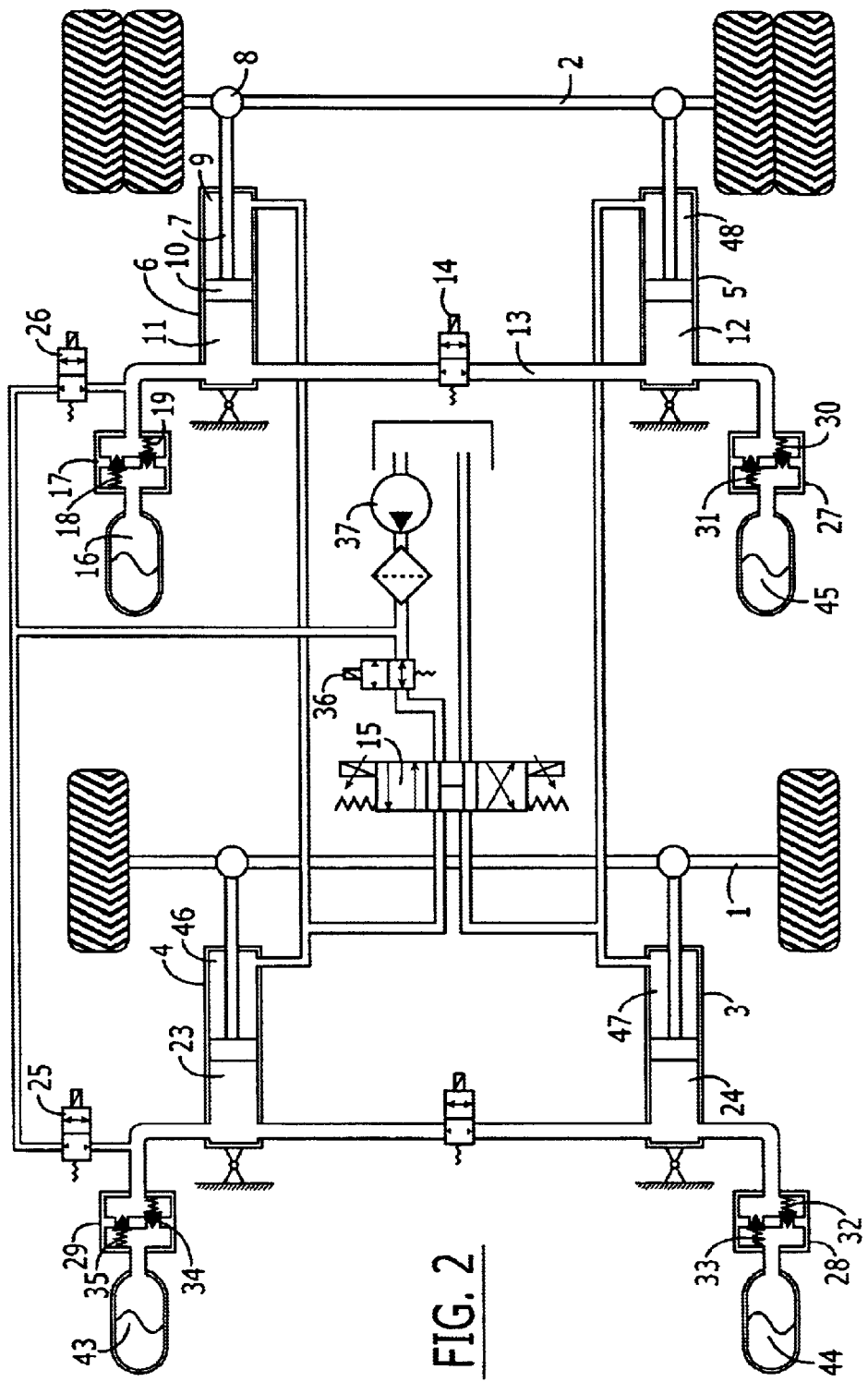
FIG. 2 illustrates a second example embodiment of a hydropneumatic suspension system, in which the suspension and automatic level control systems are supplied by a central pump.

In the hydropneumatic suspension system illustrated in FIG. 2, supplying oil in the overall system, made up of suspension, automatic level control, and roll stabilization, is performed exclusively by a pump 37.

Additionally, a valve 36 is required, which, in the open position, supplies the roll-stabilization system, and, in the closed position, controls the automatic level control system, in that pilot valves 25 and 26 are activated. Flow-dividing valve 21, control valve 22, and pump 20, which are illustrated in the hydropneumatic suspension system according to FIG. 1, are not required in this arrangement. Pump 37, having a large capacity as is required for the roll stabilization system, offers the additional advantage that, when the vehicle is at a standstill, the automatic level control can be performed in the shortest possible time. Although a central pump 37 must be dimensioned somewhat larger when it is used for all functions, nevertheless one pump and one oil container may be eliminated as a result.

Figure 3:
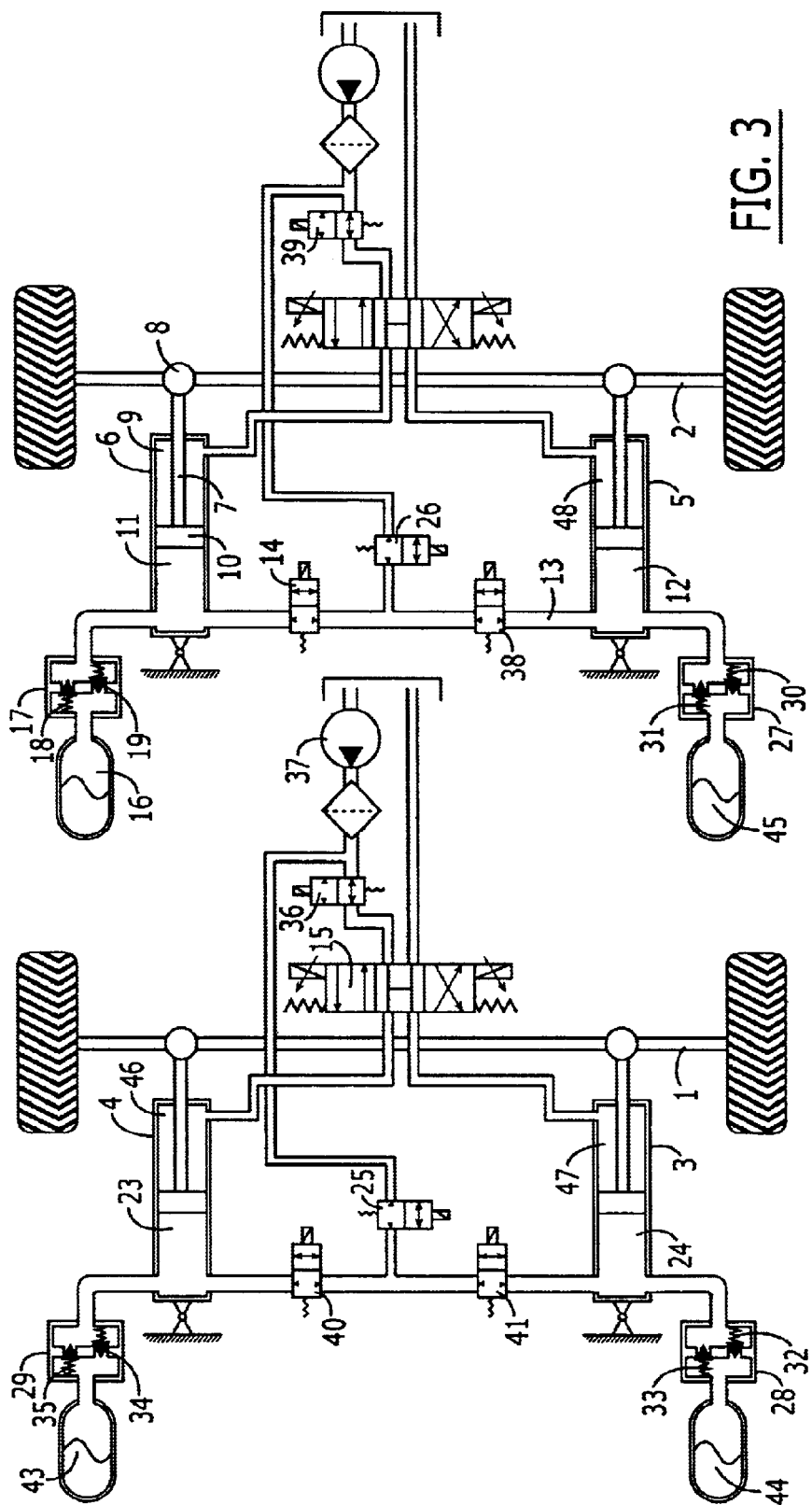
FIG. 3 illustrates a further example embodiment of a hydropneumatic suspension system, in which the front axle can be controlled independently of the rear axle.

In the example embodiment of the present invention illustrated in FIG. 3, the essential difference with regard to FIG. 2 is the division of the overall system into two systems that are independent of each other, one for front axle 1 and one for rear axle 2. In this way, each axle can be regulated independently, and, in spite of the identical suspension cylinder sizes front and rear, different pressure ratios can be set in accordance with the axle loads or the load states. Using pilot valves 14, 26, and 38, or 25, 38, and 39, the possibility exists, in addition to the automatic level control, for so-called "kneeling." In this context, the vehicle can be tilted on both sides about the vehicle longitudinal axis to make entry easier, which is particularly relevant, e.g., for city buses.

Figure 4:
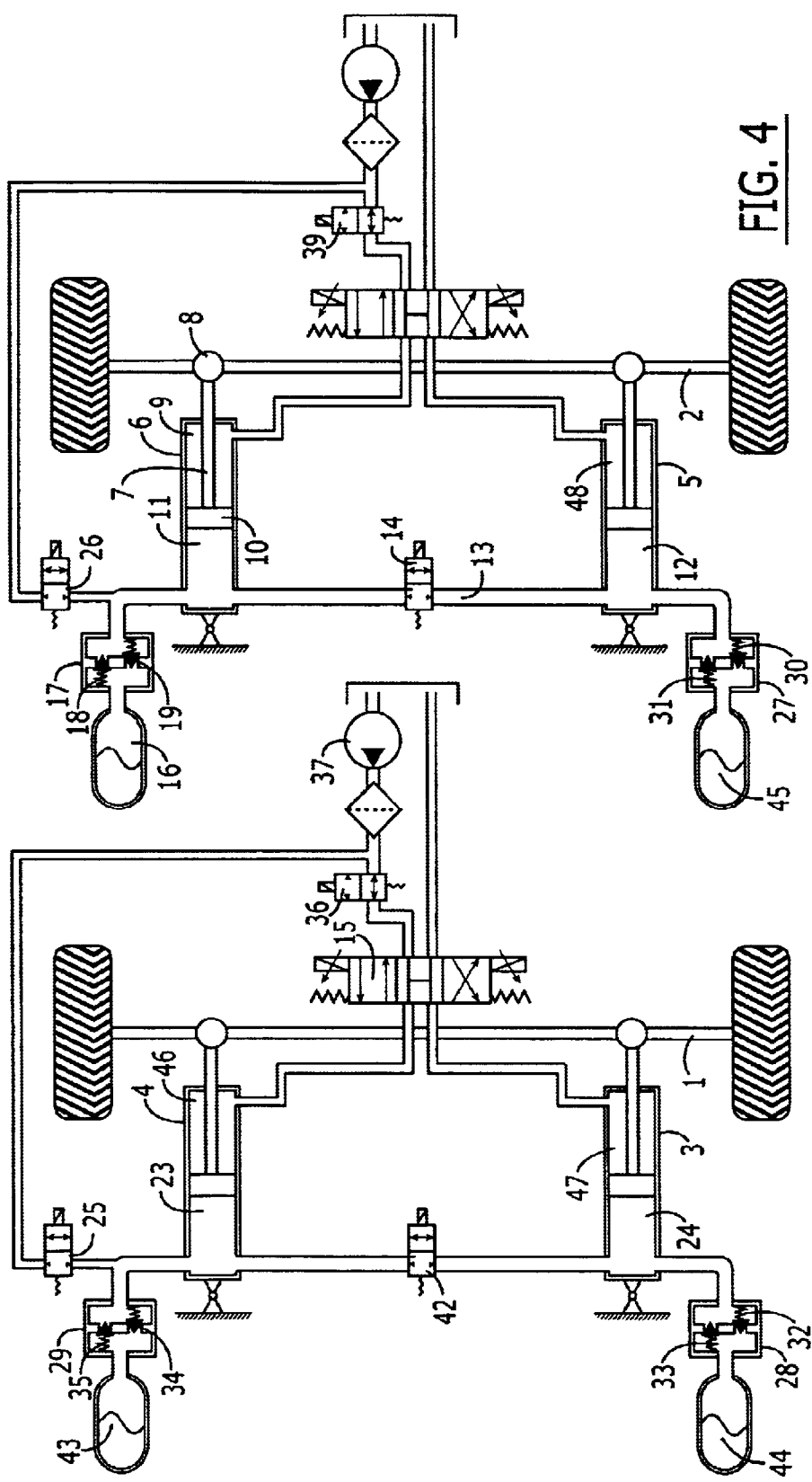
FIG. 4 illustrates a simplified variant of a hydropneumatic suspension system, in which by reducing the number of parts the number of functions is also reduced.

FIG. 4 illustrates a simplified variant of the hydropneumatic suspension system illustrated in FIG. 3, in which through the use of pilot valves 14, 25, 26, and 42, only kneeling on one side can be achieved.

What is claimed is:

1. A hydropneumatic suspension system for a motor vehicle, comprising:
at least one hydropneumatic support system, including:
at least one hydropneumatic suspension cylinder having an upper suspension cylinder space and a lower suspension cylinder space unconnected to the upper suspension cylinder space;
at least one hydropneumatic pressure reservoir; and
at least one damping valve; and
an automatic level control system cooperating with the at least one hydropneumatic suspension support system, the automatic level control system being configured to deliver hydraulic fluid from the at least one hydropneumatic pressure reservoir to the at least one hydropneumatic suspension cylinder and to return hydraulic fluid from the at least one hydropneumatic suspension cylinder to the at least one hydropneumatic pressure reservoir, the automatic level control system being connected to the upper suspension cylinder space and the lower suspension cylinder space, and configured to perform suspension and automatic level control operations in the upper suspension cylinder space, and a roll stabilization operation in the lower suspension cylinder space.

2. The hydropneumatic suspension system according to claim 1, wherein the roll stabilization operation is performed by lowering an inner vehicle side during cornering.

3. The hydropneumatic suspension system according to claim 1, wherein the at least one damping valve is configured to be controllable.

4. The hydropneumatic suspension system according to claim 1, wherein a damping characteristic of the at least one suspension cylinder is controllable in accordance with an axle load.

\* \* \* \* \*